(12) United States Patent
Mizuno

(10) Patent No.: US 11,150,102 B2
(45) Date of Patent: Oct. 19, 2021

(54) VIRTUAL-SPACE-IMAGE PROVIDING DEVICE AND PROGRAM FOR PROVIDING VIRTUAL SPACE IMAGE

(71) Applicant: Alpha Code Inc., Tokyo (JP)

(72) Inventor: Takuhiro Mizuno, Tokyo (JP)

(73) Assignee: ALPHA CODE INC., Tokyo (JP)

(*) Notice: Subject to any disclaimer, the term of this patent is extended or adjusted under 35 U.S.C. 154(b) by 0 days.

(21) Appl. No.: 17/257,450

(22) PCT Filed: May 16, 2019

(86) PCT No.: PCT/JP2019/019462
§ 371 (c)(1),
(2) Date: Dec. 31, 2020

(87) PCT Pub. No.: WO2020/017139
PCT Pub. Date: Jan. 23, 2020

(65) Prior Publication Data
US 2021/0247200 A1    Aug. 12, 2021

(30) Foreign Application Priority Data

Jul. 19, 2018 (JP) .............................. JP2018-136217

(51) Int. Cl.
*G01C 21/36* (2006.01)
*G02B 27/01* (2006.01)
(Continued)

(52) U.S. Cl.
CPC ......... *G01C 21/365* (2013.01); *G01C 21/265* (2013.01); *G01C 21/367* (2013.01); *G01C 21/3819* (2020.08); *G02B 27/017* (2013.01)

(58) Field of Classification Search
CPC .............. G01C 21/365; G01C 21/3819; G01C 21/265; G01C 21/367; G02B 27/017
See application file for complete search history.

(56) References Cited

U.S. PATENT DOCUMENTS 9,766,697 B2   9/2017 Inomata
10,284,366 B2  5/2019 Striem-Amit
(Continued)

FOREIGN PATENT DOCUMENTS

JP    2007-004525 A    1/2007
JP    2012-530317 A   11/2012
(Continued)

*Primary Examiner* — Anne Marie Antonucci
*Assistant Examiner* — Sahar Motazedi
(74) *Attorney, Agent, or Firm* — Polsinelli PC

(57) ABSTRACT

The invention is provided with: a turning determination unit 13 and an image reproducing unit 14. The turning determination unit 13 determines a section in which an automobile travels with turning, not travels straight, based on road-route information regarding a traveling route and a road on the traveling route. The image reproducing unit 14 displays a selected-virtual space image that is selected in advance in a straight section in which the automobile travels straight, and displays a turning-virtual space image for a view field turning in accordance with a turning pattern determined by a road shape and a traveling direction in a turning section, in the turning section in which the automobile travels with turning. When the automobile turns, a contradiction that occurs between information obtained by the brain through an experience of a user and information obtained by the brain through that the user views the turning-virtual space image displayed on an HMD 200 is reduced, and thus an occurrence that the autonomic nerves cause an abnormal phenomenon is suppressed.

8 Claims, 3 Drawing Sheets

(51) Int. Cl.
    *G01C 21/26*    (2006.01)
    *G01C 21/00*    (2006.01)

(56) References Cited

U.S. PATENT DOCUMENTS

| | | |
|---|---|---|
| 10,409,365 B2 | 9/2019 | Inomata |
| 2012/0256945 A1 | 10/2012 | Kidron |
| 2014/0237248 A1 | 8/2014 | Striem-Amit |
| 2015/0097863 A1* | 4/2015 | Alaniz .................. G06T 19/006 345/633 |
| 2017/0221185 A1 | 8/2017 | Inomata |
| 2017/0364146 A1 | 12/2017 | Inomata |
| 2018/0211414 A1* | 7/2018 | Cronin .................. B60W 40/02 |
| 2018/0357836 A1 | 12/2018 | Ishiguro et al. |

FOREIGN PATENT DOCUMENTS

| | | |
|---|---|---|
| JP | 2017-138701 A | 8/2017 |
| JP | 2018-076027 A | 5/2018 |
| WO | WO 2017/142009 A1 | 8/2017 |

\* cited by examiner (1)  (2)  (3)  (4)  (5)  (6)

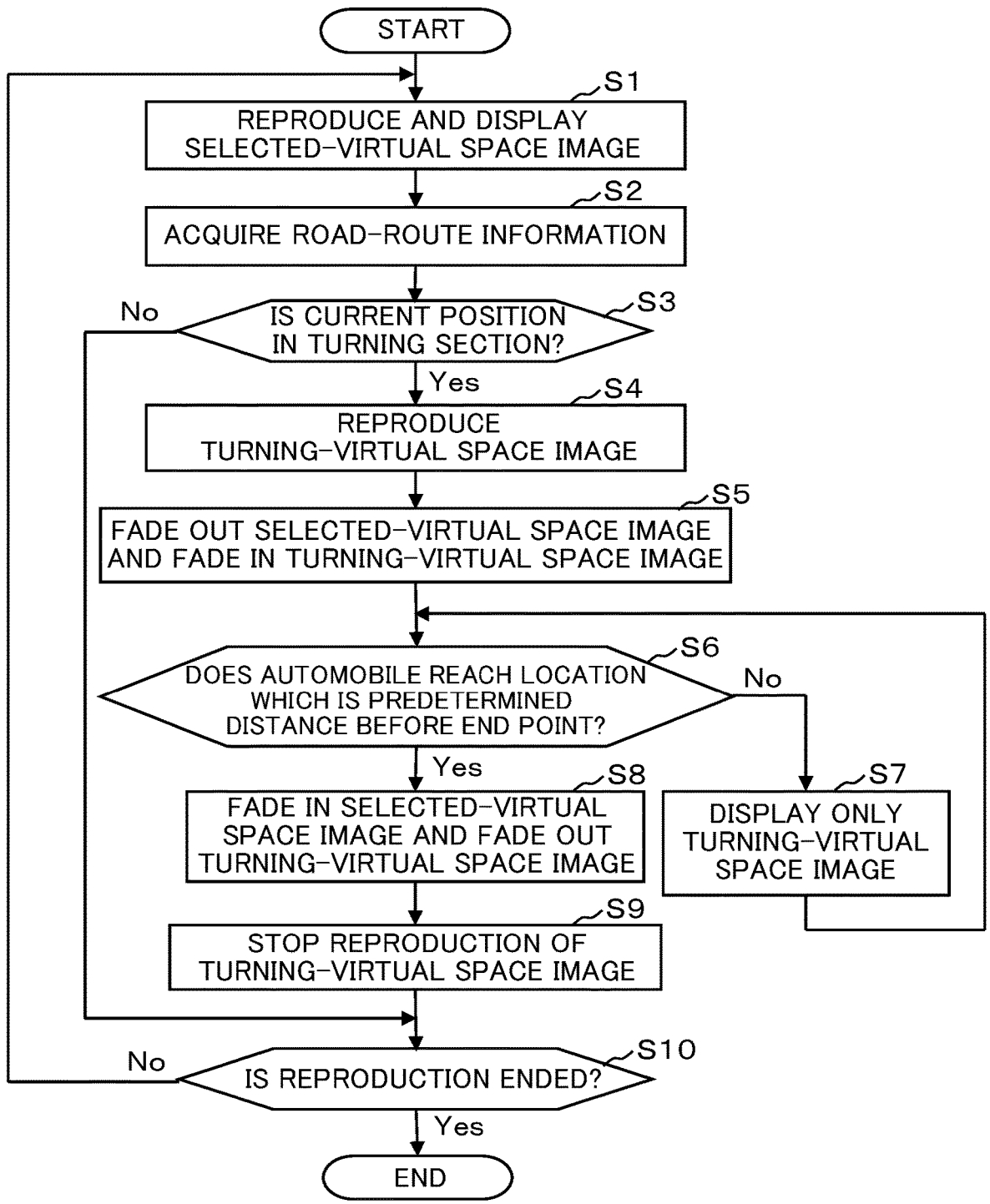

VIRTUAL-SPACE-IMAGE PROVIDING DEVICE AND PROGRAM FOR PROVIDING VIRTUAL SPACE IMAGE

CROSS REFERENCE TO RELATED APPLICATIONS

This application is a National Phase filing under 35 U.S.C. § 371 of PCT/JP2019/019462 filed on 16 May 2019; which application in turn claims priority to Application No. 2018-136217 filed in Japan on 19 Jul. 2018. The entire contents of each application are hereby incorporated by reference.

TECHNICAL FIELD

The present invention relates to a virtual-space-image providing device and a program for providing a virtual space image, and is particularly suitable for use in an apparatus that provides a virtual space image for being displayed as virtual reality on a head mounted display.

BACKGROUND ART

A user who views a virtual space image displayed as virtual reality (VR) on a head mounted display (HMD) may experience discomfort or nausea like motion sickness. This is the so-called "VR sickness". Various causes of VR sickness are considered, and the theory that VR sickness is an abnormal phenomenon of the autonomic nerves is considered as being highly possible. When a user wearing the HMD is viewing the virtual space image, the scenery moves in a virtual space at which that the user is looking. However, since the user himself/herself is not moving, the body basically keeps still. Thus, there is a contradiction between information from the "viewing scenery" and information from "feeling of the body". Due to such a contradiction, the autonomic nerves cause an abnormal phenomenon, resulting in VR sickness.

In view of such a problem, a technology of suppressing VR sickness is proposed in the related art (for example, see Patent Document 1). In a virtual-space-image providing device disclosed in Patent Document 1, a direction in which an image information-amount reduction processing is performed is set based on a rotation direction of the HMD, and a range and intensity for performing the image information-amount reduction processing are set based on a rotation speed of the HMD. It is possible to reduce an occurrence of VR sickness in a visual recognition state in which a view field of the user in a virtual space is linked to the movement of the HMD, by performing the image information-amount reduction processing in a virtual space to be visually recognized by the user based on the displacement of the HMD to generate an image in which an image information amount is reduced. Here, the image information-amount reduction processing refers to various types of image processing for reducing an image information amount, for example, blurring of an image, reduction of contrast, and reduction of chromaticity information.

Patent Document 1: JP-A-2017-138701

SUMMARY OF THE INVENTION

Technical Problem

By the way, the virtual space image can be reproduced anywhere as long as a reproducing device and the HMD are provided. For example, the virtual space image can be reproduced in a car. Currently, many vehicles are equipped with in-vehicle devices, and video contents such as a DVD video and a TV video can be reproduced and displayed. In addition to this, it is expected that the number of users who enjoy the VR experience in a car will increase in the future.

Especially in recent years, the development of an autonomous driving car has been progressing rapidly. In the case of an autonomous driving car having a level of 4 or higher according to the level definition of autonomous driving, a system recognizes the traffic conditions around the vehicle and performs all operations relating to driving, which include emergency responses. In the autonomous driving car having a level of 4 or higher, a driver does not need to be involved in driving (strictly, there is no driver), so all passengers can wear the HMD in the car and view the virtual space image. In order for users to enjoy such a VR experience in the car, it is important to introduce a technology for suppressing the occurrence of VR sickness.

The invention has been made in view of such circumstances, an object of the invention is to enable suppression of VR sickness of a user who views a virtual space image when the virtual space image is reproduced and displayed on an HMD in a car.

Solution to Problem

To solve the above-described problems, according to the invention, a virtual-space-image providing device includes an image reproducing unit that reproduces a virtual space image and displays the virtual space image on a head mounted display. The virtual-space-image providing device determines a section in which an automobile travels with turning, not travels straight, based on road-route information regarding a traveling route of the automobile and a road on the traveling route. The virtual-space-image providing device displays a selected-virtual space image that is selected in advance in a straight section in which the automobile travels straight, and displays a virtual space image for turning (turning-virtual space image) that a view field turns in accordance with a turning pattern determined by a road shape and a traveling direction in a turning section, in the turning section in which the automobile travels with turning.

Advantageous Effects of the Invention

According to the invention configured as described above, when an automobile travels in a turning section on a traveling route, a turning-virtual space image for a view field turning in accordance with a turning pattern determined by a road shape and a traveling direction in the turning section is displayed on a head mounted display. Thus, when the automobile turns, a contradiction that occurs between information obtained by the brain through an experience of a user and information obtained by the brain through that the user views the turning-virtual space image displayed on the head mounted display is reduced. Thus, it is possible to suppress an occurrence that the autonomic nerves cause an abnormal phenomenon and to suppress VR sickness of the user who views a virtual space image in a car.

BRIEF DESCRIPTION OF THE DRAWINGS

FIG. 4 is a flowchart illustrating an example of an operation of the virtual-space-image providing device according to the embodiment.

MODE FOR CARRYING OUT THE INVENTION

Figure 1:
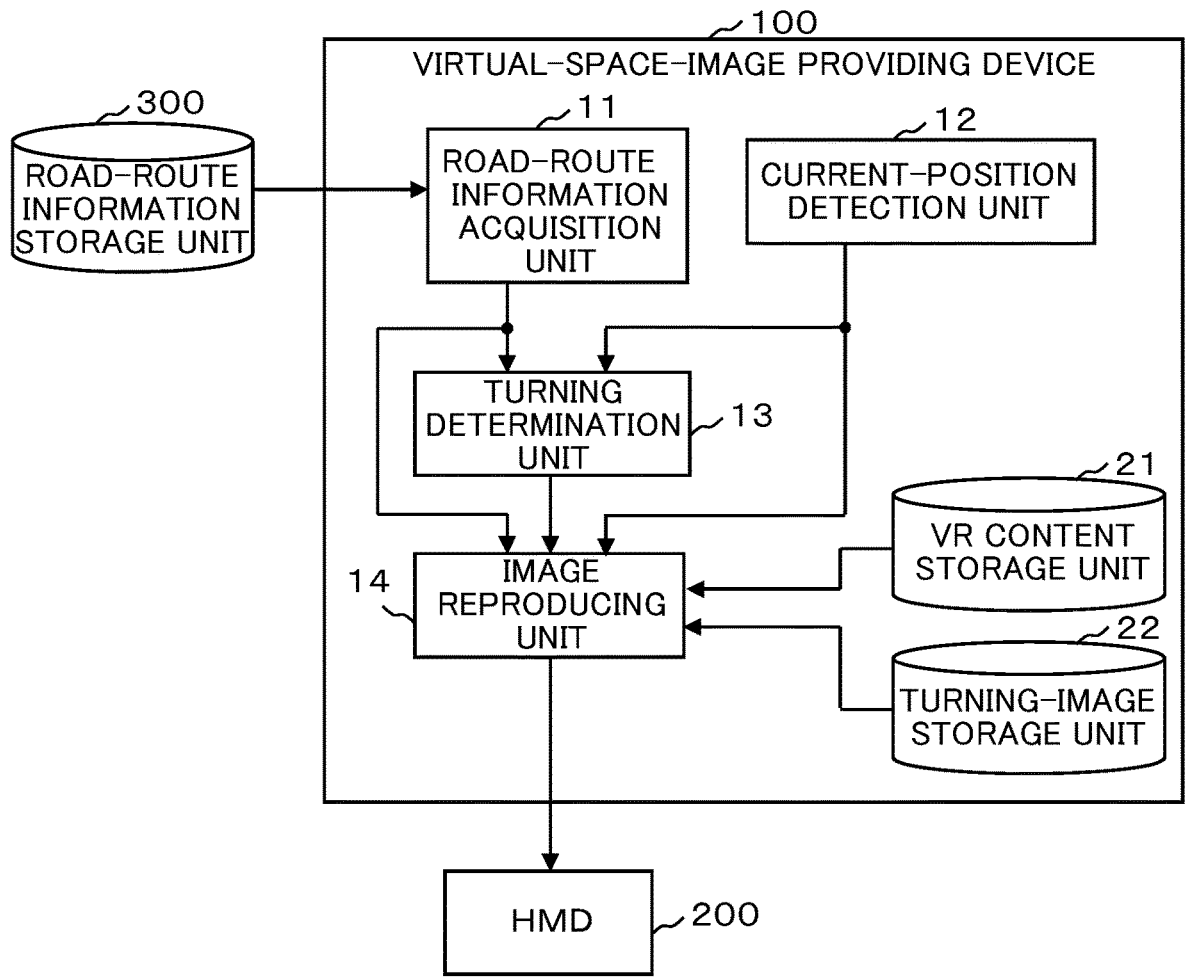
FIG. 1 is a block diagram illustrating an example of a functional configuration of a virtual-space-image providing device according to an embodiment.

Hereinafter, an embodiment of the invention will be described with reference to the drawings. FIG. 1 is a block diagram illustrating an example of a functional configuration of a virtual-space-image providing device according to an embodiment. In the embodiment, a virtual-space-image providing device 100 is mounted in a vehicle such as an automobile, and generates a virtual space image to display the virtual space image on a head mounted display (HMD) 200.

In particular, in the virtual-space-image providing device 100 in the embodiment, a virtual space image causing a view field to turn in accordance with a section in which the automobile travels with turning is generated based on a preset traveling route of the automobile and a road shape on the traveling route and the virtual space image is displayed. Thus, it is possible to reduce an occurrence of VR sickness of a user who views the virtual space image during traveling of the automobile.

The virtual-space-image providing device 100 in the embodiment includes a road-route information acquisition unit 11, a current-position detection unit 12, a turning determination unit 13, and an image reproducing unit 14, as a functional configuration. In addition, the virtual-space-image providing device 100 in the embodiment includes a VR content storage unit 21 and a turning-image storage unit 22 as a storage medium. The functional blocks 11 to 14 can be configured by any of hardware, a digital signal processor (DSP), and software. For example, when the functional blocks are configured by software, the functional blocks 11 to 14 are configured to include a CPU, a RAM, a ROM, and the like of a computer in practice, and are implemented by operating a program for providing a virtual space image, which is stored in the RAM or the ROM, or a storage medium such as a hard disk or a semiconductor memory.

The road-route information acquisition unit 11 acquires road-route information regarding a traveling route of an automobile and a road on the traveling route. Here, the information regarding the traveling route of the automobile refers to information obtained by known route search processing. That is, the information regarding the traveling route refers to route information searched as a route connecting the current location to the destination based on map data including information regarding road links that represent roads and lanes in small divided pieces and information regarding nodes that represent points at both ends of each road link (including points in which a plurality of roads intersect with each other, such as intersections and branches). As an example, a vehicle in which the virtual-space-image providing device 100 in the embodiment is mounted is an autonomous driving car having a level of 4 or higher. Information regarding a traveling route, which is acquired by the road-route information acquisition unit 11, indicates a route on which the autonomous driving car travels by autonomous driving.

In addition, the information regarding the road on the traveling route refers to information indicating the shape of the road. The information regarding the road refers to information included in a known map data used in route search described above. With the information regarding the shape of the road, it is possible to recognize whether the road is a straight road or a curved road. Regarding the curved road, it is possible to recognize the size of the curve from information on the radius of curvature or the like. Further, with the information regarding the shape of the road, it is possible to recognize whether or not the node in the road corresponds to an intersection or a branch, or to recognize the number of roads that intersect or branch, the direction of the road that intersects or branches, and the like.

As described above, the information regarding the traveling route and the information regarding the road are stored in a road-route information storage unit 300, as a result of the route search obtained by a known route search device (not illustrated). That is, the road-route information storage unit 300 stores information on a traveling route that connects the current location of a vehicle to the destination and information representing the shape of a road forming the traveling route. Note that, the road-route information storage unit 300 may be a storage medium mounted in the vehicle and may be a storage medium provided in a remote server connected from the vehicle via a communication network. The road-route information acquisition unit 11 acquires road-route information from the road-route information storage unit 300.

Note that, the road-route information stored in the road-route information storage unit 300 is appropriately updated. That is, at a time point at which route search is firstly performed by the route search device, road-route information regarding the searched traveling route and the road on the traveling route is stored in the road-route information storage unit 300. Then, in a case where the route search device re-searches a traveling route that bypasses a congested section in accordance with road traffic conditions, the road-route information is updated by storing the road-route information regarding the re-searched traveling route and the road on the traveling route, in the road-route information storage unit 300.

The current-position detection unit 12 detects the current position of the automobile on the traveling route. The current-position detection unit 12 detects the current position of a vehicle with a known self-contained navigation sensor, a global positioning system (GPS) receiver, or the like.

The turning determination unit 13 determines a section in which the automobile travels with turning, not travels straight, on the traveling route based on the road-route information acquired by the road-route information acquisition unit 11. In the embodiment, the turning determination unit 13 determines whether or not the current position on the traveling route is in a turning section, based on the current position detected by the current-position detection unit 12 in addition to the road-route information acquired by the road-route information acquisition unit 11.

Here, the turning section can be freely defined. For example, a section of a road link connected to a node such as an intersection or a branch, a section in which road links are not connected linearly, a section in which a plurality of road shape points representing the road shape are not arranged linearly, and the like may be defined as the turning section. Alternatively, a section including straight road links located immediately before and after the section as described above may be defined as the turning section.

The image reproducing unit 14 reproduces the virtual space image and displays the virtual space image on the HMD 200. In the embodiment, in a straight section in which the automobile travels straight, the image reproducing unit 14 reproduces a virtual space image (referred to as a selected-virtual space image below) of VR contents selected in advance among one or more VR contents stored in the VR content storage unit 21, and displays the selected-virtual space image on the HMD 200. For example, a user operates an operation unit (not illustrated) of the virtual-space-image providing device 100 to select the VR contents.

Here, the VR contents stored in the VR content storage unit 21 refer to moving images configured by virtual space images. For example, the VR contents are moving image contents in which the scenery that spreads out in a view field is shown with virtual space images when the automobile travels on mountains, plateaus, roads along the coast, and the like. Further, the VR contents may be moving image contents in which a game screen of a car racing game, a shooting game, or the like is shown with a virtual space image. In addition, any moving image content including a scene in which the view field turns depending on the situation is suitable as the VR contents reproduced by the virtual-space-image providing device 100 in the embodiment.

On the other hand, in a turning section determined by the turning determination unit 13, in which the automobile travels with turning, the image reproducing unit 14 reproduces a virtual space image for turning (turning-virtual space image) that the view field turns in accordance with a turning pattern determined by a road shape and a traveling direction in the turning section, and displays the reproduced turning-virtual space image on the HMD 200.

Figure 2:
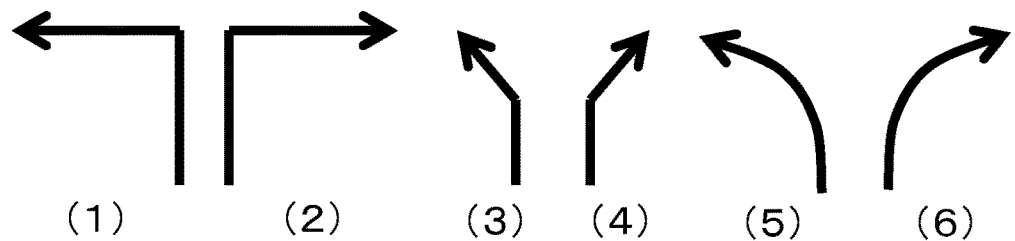
FIG. 2 is a diagram illustrating an example of a turning pattern.

The turning pattern determined by the road shape and the traveling direction in the turning section refers to some patterns specified by the distinction between left turning and right turning and the way of turning. FIG. 2 is a diagram illustrating an example of the turning pattern. FIG. 2 illustrates six turning patterns. A first turning pattern (1) is a left turn pattern of 90 degrees to the left. A second turning pattern (2) is a right turn pattern of 90 degrees to the right. A third turning pattern (3) is a left branch pattern of x degrees (x indicates a value that is freely set) to the left. A fourth turning pattern (4) is a right branch pattern of x degrees to the right. A fifth turning pattern (5) is a left curve pattern having a radius R of curvature (R indicates a value that is freely set). A sixth turning pattern (6) is a right curve pattern having a radius R of curvature.

The turning-image storage unit 22 stores the turning-virtual space image that the view field turns in accordance with the turning pattern, in advance, for each of a plurality of turning patterns determined by the road shape and the traveling direction in the turning section. That is, the turning-image storage unit 22 stores the turning-virtual space image that the view field turns in accordance with the turning pattern for each of the six turning patterns illustrated in FIG. 2. The turning-virtual space image is stored for each VR content stored in the VR content storage unit 21. Note that, here, the six turning patterns are described as an example, but the embodiment is not limited to this. For example, a plurality of branch patterns may be provided for each of a plurality of branch angles x. Similarly, a plurality of curve patterns may be provided for each of a plurality of radii R of curvature.

The image reproducing unit 14 reads, from the turning-image storage unit 22, a turning-virtual space image corresponding to a turning pattern closest to a turning mode determined by the road shape and the traveling direction of the turning section, in the turning section determined by the turning determination unit 13. Then, the image reproducing unit 14 reproduces read the turning-virtual space image and displays the turning-virtual space image on the HMD 200. There are various practical turning modes (modes of how to turn in which direction of the left and right directions) determined by the road shape and the traveling direction of the turning section. So the practical turning modes are not limited to completely coincide with any of the six turning patterns illustrated in FIG. 2. In the embodiment, a turning pattern closest to the practical turning mode among the six turning patterns is specified, and a turning-virtual space image corresponding to the specified turning pattern is read from the turning-image storage unit 22. Then, the turning-virtual space image is reproduced.

Specifically, when the turning determination unit 13 determines that the current position is in the turning section, the image reproducing unit 14 reproduces and displays the selected-virtual space image and the turning-virtual space image in a manner that the display is slowly switched from the selected-virtual space image to the turning-virtual space image from a start point of the turning section determined by the turning determination unit 13, and the display is slowly switched from the turning-virtual space image to the selected-virtual space image toward an endpoint of the turning section.

For example, in a predetermined section from the start point of the turning section determined by the turning determination unit 13, the image reproducing unit 14 reads the selected-virtual space image from the VR content storage unit and reproduces the selected-virtual space image, and simultaneously reads the turning-virtual space image from the turning-image storage unit 22 and reproduces the turning-virtual space image. The image reproducing unit 14 composes the selected-virtual space image and the turning-virtual space image and displays the composite image on the HMD 200. At this time, the image reproducing unit 14 fades out the selected-virtual space image so that the composition ratio slowly approaches 0%, and fades in the turning-virtual space image so that the composition ratio slowly approaches 100%.

After the vehicle passes the predetermined section from the start point of the turning section, the image reproducing unit 14 reads the turning-virtual space image from the turning-image storage unit 22, and reproduces the turning-virtual space image. Then, the image reproducing unit 14 displays only the turning-virtual space image on the HMD 200. Further, in a predetermined section before the endpoint of the turning section, the image reproducing unit 14 reads the selected-virtual space image from the VR content storage unit 21 and reproduces the selected-virtual space image, and simultaneously reads the turning-virtual space image from the turning-image storage unit 22 and reproduces the turning-virtual space image. The image reproducing unit 14 composes the selected-virtual space image and the turning-virtual space image and displays the composite image on the HMD 200. At this time, the image reproducing unit 14 fades in the selected-virtual space image so that the composition ratio slowly approaches 100%, and fades out the turning-virtual space image so that the composition ratio slowly approaches 0%.

Note that, in a case where a selected-virtual space image related to the scenery that can be seen when a vehicle travels on a road of a mountain, a road along the sea, or the like, when a turning-virtual space image relating the scenery along the sea is displayed during a display of the selected-virtual space image related to the mountain scenery, the user feels uncomfortable. Therefore, it is preferable to do as follows. That is, while the turning-virtual space image for the mountain or seaside is stored in the turning-image storage unit 22, metadata on what kind of scenery is reproduced is recorded for each reproduction time or each chapter regarding the VR contents stored in the VR content storage unit 21. Then, the image reproducing unit 14 reproduces the VR contents (selected-virtual space image) and also reproduces the metadata. Then, the image reproducing unit 14 reads the turning-virtual space image for the mountain or seaside from the turning-image storage unit 22 in accordance with the metadata reproduced when the vehicle travels in the turning section, and reproduces the turning-virtual space image.

Similar to this, regardless of the details of the VR contents, while the metadata on what kind of details of the virtual space image is reproduced is recorded for each reproduction time or each chapter, the turning-virtual space image having details in corresponding to the metadata is stored in advance in the turning-image storage unit 22. Thus, the turning-virtual space image corresponding to the metadata of the VR contents reproduced when the vehicle travels in the turning section may be read from the turning-image storage unit 22, and then be reproduced.

Figure 3:
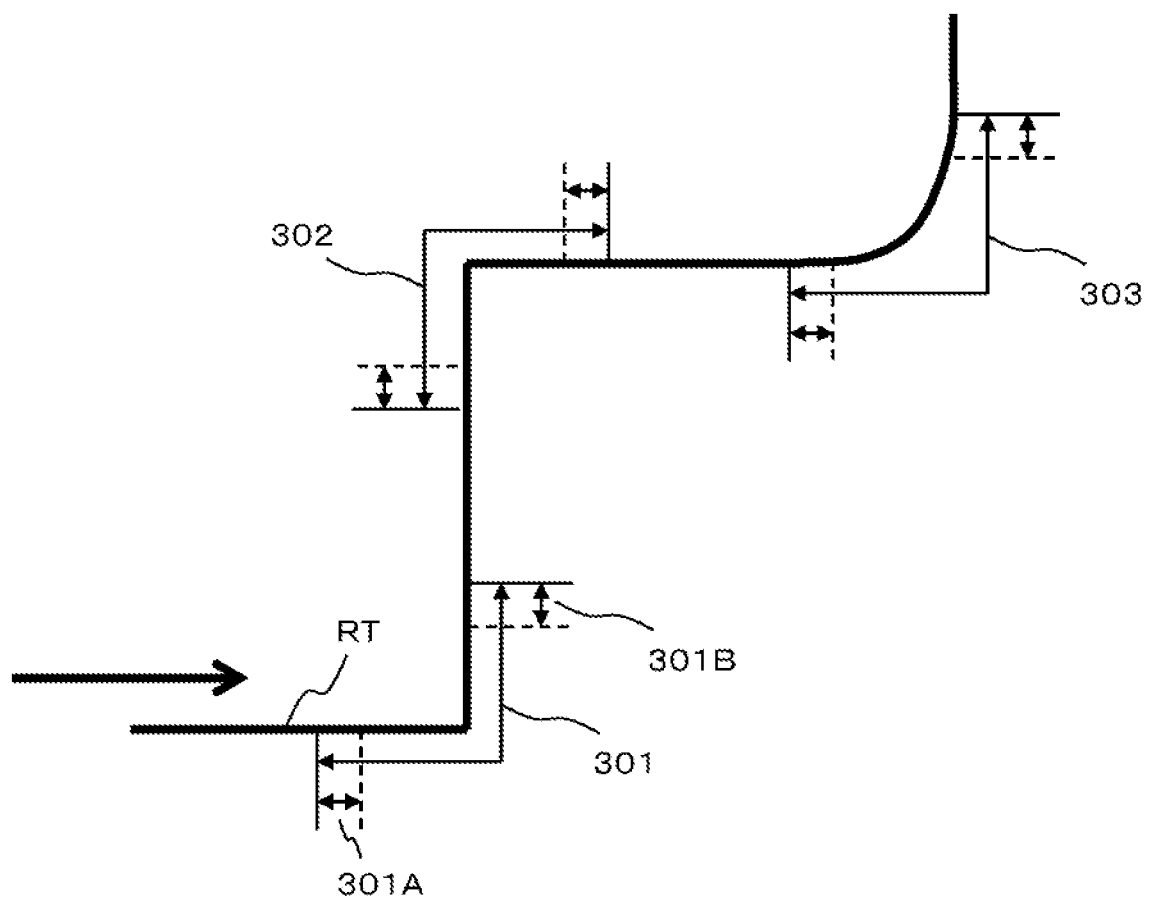
FIG. 3 is a diagram illustrating an example of processing of an image reproducing unit together with a traveling route in the embodiment.

FIG. 3 is a diagram illustrating an example of processing of the image reproducing unit 14 as described above together with a traveling route. Three turning sections 301 to 303 are provided on a traveling route RT illustrated in FIG. 3. A turning pattern closest to a turning mode of the first turning section 301 is the first turning pattern (1) illustrated in FIG. 2, that is, a left turn pattern of 90 degrees to the left. When the vehicle reaches the start point of the turning section 301, the turning determination unit 13 detects that the current position of the vehicle is in the turning section 301.

In response to this, in a predetermined section 301A from the start point of the turning section, the image reproducing unit 14 reads a turning-virtual space image corresponding to the first turning pattern (1), from the turning-image storage unit 22 and reproduces the turning-virtual space image, while continuing processing of reading a selected-virtual space image from the VR content storage unit 21 and reproducing the selected-virtual space image. Then, the image reproducing unit 14 composes the selected-virtual space image subjected to fade-out processing with the composition ratio slowly approaching 0% and the turning-virtual space image subjected to fade-in processing with the composition ratio slowly approaching 100%, and displays the composite image on the HMD 200.

After the vehicle passes the predetermined section 301A from the start point of the turning section 301, the image reproducing unit 14 continuously reproduces the turning-virtual space image from the turning-image storage unit 22, and displays only the turning-virtual space image on the HMD 200. At this time, the image reproducing unit 14 also continuously performs processing of reading a selected-virtual space image from the VR content storage unit 21 and reproducing the selected-virtual space image, but the display of the selected-virtual space image on the HMD 200 is not performed. The reproduction of the selected-virtual space image may be stopped during a period in which only the turning-virtual space image is displayed on the HMD 200. However, since the selected-virtual space image is reproduced along with the reproduction of the turning-virtual space image, so as to advance the progress of the scene, it is possible to display the selected-virtual space image from the scene after the elapse of the time when the turning-virtual space image is displayed, when the turning-virtual space image is switched back to the selected-virtual space image. Thus, it is possible to perform switching relatively seamlessly without discomfort. Accordingly, this is preferable.

Further, in a predetermined section 301B before the end point of the turning section 301, the image reproducing unit 14 reads the selected-virtual space image from the VR content storage unit 21 and reproduces the selected-virtual space image, and simultaneously reads the turning-virtual space image from the turning-image storage unit 22 and reproduces the turning-virtual space image. Then, the image reproducing unit 14 composes the selected-virtual space image subjected to fade-in processing with the composition ratio slowly approaching 100% and the turning-virtual space image subjected to fade-out processing with the composition ratio slowly approaching 0%, and displays the composite image on the HMD 200.

Here, the image reproducing unit 14 determines whether the vehicle enters into the predetermined section 301B before the end point of the turning section 301, based on the road-route information acquired by the road-route information acquisition unit 11 and the current position detected by the current-position detection unit 12. That is, the image reproducing unit 14 determines whether or not the automobile reaches at a location which is a predetermined distance before the end point of the turning section 301. Note that, the time taken to perform fade-in/fade-out processing is fixed, but the time taken for the automobile to travel in the predetermined section 301B varies depending on the traveling speed of the automobile. Therefore, the length of the predetermined section 301B may change depending on the type of road (general road, expressway, and the like) of the predetermined section 301B. Alternatively, vehicle speed information when the automobile travels in the predetermined section 301B may be acquired from a control unit and the like of the automobile, and the length of the predetermined section 301B may change depending on the acquired vehicle speed information.

Then, after the automobile passes the turning section 301, the image reproducing unit 14 stops processing of reading the turning-virtual space image from the turning-image storage unit 22 and reproducing the turning-virtual space image, and performs only processing of reading the selected-virtual space image from the VR content storage unit 21 and reproducing the selected-virtual space image.

Then, when the vehicle reaches the start point of the second turning section 302 on the traveling route RT, the turning determination unit 13 detects that the current position of the vehicle is in the turning section 302. In response to this, the image reproducing unit 14 performs processing similar to the processing performed in the first turning section 301, in the second turning section 302. Note that, a turning pattern closest to a turning mode of the second turning section 302 is the second turning pattern (2) illustrated in FIG. 2, that is, a right turn pattern of 90 degrees to the right. Thus, the image reproducing unit 14 reads a turning-virtual space image corresponding to the second turning pattern (2) from the turning-image storage unit 22 and reproduces the turning-virtual space image.

Further, when the vehicle reaches the start point of the third turning section 303 on the traveling route RT, the turning determination unit 13 detects that the current position of the vehicle is in the turning section 303. In response to this, the image reproducing unit 14 performs processing similar to the processing performed in the first turning section 301, in the third turning section 303. Note that, a turning pattern closest to a turning mode of the third turning section 303 is the fifth turning pattern (5) illustrated in FIG.

2, that is, a left curve pattern having a radius R of curvature. Thus, the image reproducing unit 14 reads a turning-virtual space image corresponding to the fifth turning pattern (5) from the turning-image storage unit 22 and reproduces the turning-virtual space image.

FIG. 4 is a flowchart illustrating an example of an operation of the virtual-space-image providing device 100 configured as described above, according to the embodiment. For example, route search is performed by the route search device, and the road-route information is stored in the road-route information storage unit 300. Then, at a time at which the vehicle starts autonomous driving along the traveling route, the flowchart illustrated in FIG. 4 is started. Note that, the current-position detection unit 12 normally detects the current position during execution of the flowchart illustrated in FIG. 4.

Firstly, the image reproducing unit 14 reproduces a virtual space image (selected-virtual space image) of VR contents selected by a user among one or more VR contents stored in the VR content storage unit 21, and displays the selected-virtual space image on the HMD 200 (Step S1). In addition, the road-route information acquisition unit 11 acquires road-route information stored in the road-route information storage unit 300 (Step S2). Here, the road-route information storage unit 300 may acquire the road-route information from the current location to the destination, and may acquire at least road-route information on the surrounding of the current position detected by the current-position detection unit 12.

Then, the turning determination unit 13 determines whether or not the current position on the traveling route is in a turning section, based on the road-route information acquired by the road-route information acquisition unit 11 and the current position detected by the current-position detection unit 12 (Step S3). When the current position is not in the turning section, the process proceeds to Step S10. On the other hand, when the turning determination unit 13 determines that the current position is in the turning section, the image reproducing unit 14 reads a turning-virtual space image corresponding to a turning pattern closest to the turning mode determined by the road shape and the traveling direction of the turning section, from the turning-image storage unit and reproduces the turning-virtual space image while continuing processing of reading a selected-virtual space image from the VR content storage unit 21 and reproducing the selected-virtual space image (Step S4).

Then, the image reproducing unit 14 composes the selected-virtual space image subjected to fade-out processing with the composition ratio slowly approaching 0% and the turning-virtual space image subjected to fade-in processing with the composition ratio slowly approaching 100%, and displays the composite image on the HMD 200 (Step S5). Then, the image reproducing unit 14 determines whether or not the automobile reaches a location which is a predetermined distance before the end point of the turning section, based on the road-route information acquired by the road-route information acquisition unit 11 and the current position detected by the current-position detection unit 12 (Step S6).

When the automobile does not reach yet the location which is the predetermined distance before the end point of the turning section, the image reproducing unit 14 displays only the turning-virtual space image which is read from the turning-image storage unit 22 and produced, on the HMD 200, while continuing the processing of reading the selected-virtual space image from the VR content storage unit 21 and reproducing the selected-virtual space image (Step S7). On the other hand, when the automobile reaches the location which is the predetermined distance before the end point of the turning section, the image reproducing unit 14 composes the selected-virtual space image subjected to fade-in processing with the composition ratio slowly approaching 100% and the turning-virtual space image subjected to fade-out processing with the composition ratio slowly approaching 0%, and displays the composite image on the HMD 200 (Step S8).

When the fade-in/fade-out processing is ended, the image reproducing unit 14 stops processing of reproducing the turning-virtual space image (Step S9). Then, the image reproducing unit 14 determines whether or not the reproduction of the selected-virtual space image is ended (Step S10). When the production is not ended yet, the process returns to Step S1. In this case, the display of only the selected-virtual space image reproduced in Step S1 is continuously performed. On the other hand, when the reproduction of the selected-virtual space image is ended, the processing of the flowchart illustrated in FIG. 4 is ended.

As described above in detail, in the embodiment, the section in which the automobile travels with turning, not travels straight, is determined based on the road-route information regarding the traveling route of the automobile and the road on the traveling route. In the straight section in which the automobile travels straight, the selected-virtual space image selected in advance is displayed. In the turning section in which the automobile travels with turning, the turning-virtual space image that the view field turns in accordance with the turning pattern determined by the road shape and the traveling direction in the turning section is displayed.

According to the embodiment configured as described above, when the automobile travels in the turning section on the traveling route, the turning-virtual space image that the view field turns in accordance with the turning pattern determined by the road shape and the traveling direction in the turning section is displayed on the HMD 200. Thus, when the automobile turns, a contradiction that occurs between information obtained by the brain through the experience of the user and information obtained by the brain through that the user views the turning-virtual space image displayed on the HMD 200 is reduced. Thus, it is possible to suppress an occurrence that the autonomic nerves cause an abnormal phenomenon and to suppress VR sickness of the user who views a virtual space image in a car.

Note that, in the embodiment, an example in which fade-in/fade-out processing is performed by composing the selected-virtual space image and the turning-virtual space image in the predetermined section from the start point of the turning section and the predetermined section before the end point of the turning section is described. The invention is not limited to this example. For example, the selected-virtual space image and the turning-virtual space image may not be composed, the switching may be simply performed so that only the turning-virtual space image is displayed in the turning section, and only the selected-virtual space image is displayed in other sections. That is, when the turning determination unit 13 determines that the current position is in the turning section, the image reproducing unit 14 may display the turning-virtual space image instead of the selected-virtual space image.

Further, in the embodiment, an example in which the turning-virtual space image is stored in advance in the turning-image storage unit 22 for each turning pattern, and the turning-virtual space image is read from the turning-image storage unit 22 and is reproduced is described. The turning-virtual space image may be generated in real time. In this case, when the vehicle approaches the turning section, the image reproducing unit 14 generates a virtual space image in which the view field turns before the vehicle reaches the turning section, and reproduces the generated virtual space image in accordance with the turning section.

In this case, before the automobile enters into the turning section, a time to generate the turning-virtual space image is required. Therefore, the turning determination unit 13 determines whether or not the turning section is provided in front of the current position on the traveling route, based on the road-route information acquired by the road-route information acquisition unit 11 and the current position detected by the current-position detection unit 12. Here, the front of the current position means a section from the current position to a predetermined distance ahead of the current position. That is, the turning determination unit 13 determines whether or not the turning section is provided in the front ahead of the current position within the predetermined distance.

When the turning determination unit 13 determines that the turning section is provided in front of the current position, the image reproducing unit 14 generates the turning-virtual space image, for example, based on the selected-virtual space image reproduced during a period in which the automobile reaches, from the current position, the turning section determined by the turning determination unit 13. Then, the image reproducing unit 14 displays the generated turning-virtual space image on the HMD 200 in the turning section. That is, in the section from the location at which it is determined that the turning section is provided in the front, to the start point of the turning section, the image reproducing unit 14 displays the selected-virtual space image reproduced during this period on the HMD 200, and processes the reproduced selected-virtual space image to generate the turning-virtual space image. Details of such processing are determined in accordance with the turning pattern of the turning section.

As described above, since the turning-virtual space image is generated using the selected-virtual space image which is actually reproduced, and is displayed, it is possible to more seamlessly perform switching from the selected-virtual space image to the turning-virtual space image in switching from the straight section to the turning section, and switching from the turning-virtual space image to the selected-virtual space image in switching from the turning section to the straight section, without discomfort.

Further, in the embodiment, an example in which the turning-virtual space image is read from the turning-image storage unit 22 and is reproduced every time the automobile reaches the turning section is described. The invention is not limited to this example. For example, at a time when the road-route information is stored in the road-route information storage unit 300 (including a time when re-search is performed during traveling, in addition to the time when route search is firstly performed), all turning sections from the current location to the destination may be extracted. A composite image in which the turning-virtual space image is applied in all the turning sections may be generated in advance, and such a composite image may be reproduced and displayed. In this case, a speed at which the automobile travels by autonomous driving is set in advance. A time taken for the automobile to reach the turning section when the automobile travels at the set traveling speed is predicted, and the composite image is generated so that the turning-virtual space image is reproduced for the predicted time.

Note that, in this case, a difference may occur between a timing at which the turning-virtual space image in the composite image which is generated in advance is displayed, and a timing at which the automobile actually reaches the turning section, in accordance with road traffic conditions during the traveling. Therefore, if a delay in the traveling of the vehicle occurs in accordance with road traffic conditions during the traveling (when the reach distance is shorter than the reach distance when the vehicle travels at the traveling speed which is set in advance), the composite image may be re-generated, and the image may be switched to the re-generated composite image and then the re-generated composite image may be reproduced.

In addition, in the embodiment, a case where the vehicle equipped with the virtual-space-image providing device 100 is an autonomous driving car having a level of 4 or higher is described. The vehicle may be a general automobile. That is, the virtual-space-image providing device 100 in the embodiment can be applied to a case where, in the general automobile, a destination is set to perform route search, and a driver manually drives along the searched traveling route.

Further, in the embodiment, an example in which the virtual-space-image providing device 100 and the HMD 200 are separately configured is described, but the HMD 200 may be configured to include the virtual-space-image providing device 100.

In addition, the embodiment is merely an example for embodying the invention, and the technical scope of the invention should not be construed in a limited manner. That is, the invention can be practiced in various forms without departing from the gist or the main features.

REFERENCE SIGNS LIST

11 Road-route information acquisition unit
12 Current-position detection unit
13 Turning determination unit
14 Image reproducing unit
21 VR content storage unit
22 Turning-image storage unit
100 Virtual-space-image providing device
200 HMD
300 Road-route information storage unit

The invention claimed is:
1. A virtual-space-image providing device comprising:
an image reproducing unit that reproduces a virtual space image and displays the virtual space image on a head mounted display;
a road-route information acquisition unit that acquires road-route information regarding a traveling route of an automobile and a road on the traveling route; and
a turning determination unit that determines a section in which the automobile travels with turning, not travels straight, based on the road-route information acquired by the road-route information acquisition unit,
the image reproducing unit displays a selected-virtual space image that is selected in advance in a straight section in which the automobile travels straight, and displays a turning-virtual space image for a view field turning in accordance with a turning pattern determined by a road shape and a traveling direction in the turning section, wherein the display of the turning-virtual space image occurs in the turning section determined by the turning determination unit, in which the automobile travels with turning.

2. The virtual-space-image providing device according to claim 1,
further comprising a current-position detection unit that detects a current position of the automobile on the traveling route;
the turning determination unit determines whether or not the current position on the traveling route is in the turning section, based on the road-route information acquired by the road-route information acquisition unit and the current position detected by the current-position detection unit, and
when the turning determination unit determines that the current position is in the turning section, the image reproducing unit
performs display so that switching from the selected-virtual space image to the turning-virtual space image is slowly performed from a start point of the turning section determined by the turning determination unit, and
performs display so that switching from the turning-virtual space image to the selected-virtual space image is slowly performed toward an end point of the turning section determined by the turning determination unit.

3. The virtual-space-image providing device according to claim 2,
further comprising a turning-image storage unit that stores the turning-virtual space image that the view field turns in accordance with the turning pattern, in advance, for each of a plurality of turning patterns determined by the road shape and the traveling direction in the turning section;
the image reproducing unit reads, from the turning-image storage unit, the turning-virtual space image corresponding to the turning pattern closest to a turning mode determined by the road shape and the traveling direction in the turning section determined by the turning determination unit, and reproduces the turning-virtual space image, in the turning section determined by the turning determination unit, in which the automobile travels with turning.

4. The virtual-space-image providing device according to claim 1,
further comprising a current-position detection unit that detects a current position of the automobile on the traveling route;
the turning determination unit determines whether or not the current position on the traveling route is in the turning section, based on the road-route information acquired by the road-route information acquisition unit and the current position detected by the current-position detection unit, and
when the turning determination unit determines that the current position is in the turning section, the image reproducing unit displays the turning-virtual space image instead of the selected-virtual space image.

5. The virtual-space-image providing device according to claim 4,
further comprising a turning-image storage unit that stores the turning-virtual space image that the view field turns in accordance with the turning pattern, in advance, for each of a plurality of turning patterns determined by the road shape and the traveling direction in the turning section;
the image reproducing unit reads, from the turning-image storage unit, the turning-virtual space image corresponding to the turning pattern closest to a turning mode determined by the road shape and the traveling direction in the turning section determined by the turning determination unit, and reproduces the turning-virtual space image, in the turning section determined by the turning determination unit, in which the automobile travels with turning.

6. The virtual-space-image providing device according to claim 1,
further comprising a turning-image storage unit that stores the turning-virtual space image that the view field turns in accordance with the turning pattern, in advance, for each of a plurality of turning patterns determined by the road shape and the traveling direction in the turning section;
the image reproducing unit reads, from the turning-image storage unit, the turning-virtual space image corresponding to the turning pattern closest to a turning mode determined by the road shape and the traveling direction in the turning section determined by the turning determination unit, and reproduces the turning-virtual space image, in the turning section determined by the turning determination unit, in which the automobile travels with turning.

7. The virtual-space-image providing device according to claim 1,
further comprising a current-position detection unit that detects a current position of the automobile on the traveling route;
the turning determination unit determines whether or not the turning section is in front of the current position on the traveling route, based on the road-route information acquired by the road-route information acquisition unit and the current position detected by the current-position detection unit, and
when the turning determination unit determines that the turning section is in front of the current position, the image reproducing unit
generates the turning-virtual space image based on the selected-virtual space image reproduced during a period until the automobile reaches, from the current position, the turning section determined by the turning determination unit, and
displays the generated turning-virtual space image in the turning section.

8. A virtual-space image providing program stored in a non-transitory computer reading medium for providing a virtual space image, the program causing a computer to function as:
image reproducing means for reproducing the virtual space image and displaying the virtual space image on a head mounted display;
road-route information acquisition means for acquiring road-route information regarding a traveling route of an automobile and a road on the traveling route; and
turning determination means for determining a section in which the automobile travels with turning, not travels straight, based on the road-route information acquired by the road-route information acquisition means,
the image reproducing means displays a selected-virtual space image that is selected in advance in a straight section in which the automobile travels straight, and displays a turning-virtual space image for a view field turning in accordance with a turning pattern determined by a road shape and a traveling direction in the turning section, wherein the display of the turning-virtual space image occurs in the turning section in which the automobile travels with turning, the turning section being determined by the turning determination means.

* * * * *